(12) United States Patent
Hagano et al.

(10) Patent No.: US 9,434,248 B2
(45) Date of Patent: Sep. 6, 2016

(54) FUEL TANK OPENING AND CLOSING DEVICE

(71) Applicant: TOYODA GOSEI CO., LTD., Kiyosu-shi, Aichi-ken (JP)

(72) Inventors: Hiroyuki Hagano, Kiyosu (JP); Kentaro Enomoto, Kiyosu (JP); Go Oue, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 305 days.

(21) Appl. No.: 13/975,561

(22) Filed: Aug. 26, 2013

(65) Prior Publication Data

US 2014/0091095 A1 Apr. 3, 2014

(30) Foreign Application Priority Data

Sep. 28, 2012 (JP) .................. 2012-215342

(51) Int. Cl.
*B60K 15/05* (2006.01)
*B60K 15/04* (2006.01)
*B60K 15/035* (2006.01)

(52) U.S. Cl.
CPC .............. *B60K 15/05* (2013.01); *B60K 15/04* (2013.01); *B60K 2015/03552* (2013.01); *B60K 2015/0429* (2013.01); *B60K 2015/0458* (2013.01); *B60K 2015/0461* (2013.01)

(58) Field of Classification Search
CPC .................................................... B60K 15/05
USPC ....... 141/325, 326, 348, 349, 350, 351, 352, 141/353, 356, 363, 367, 369, 390; 220/4.14, 86.2, 86.4, 562, 746
See application file for complete search history.

(56) References Cited

U.S. PATENT DOCUMENTS

| | | | | |
|---|---|---|---|---|
| 4,917,157 A | * | 4/1990 | Gifford et al. .................. | 141/59 |
| 5,056,570 A | * | 10/1991 | Harris et al. .................... | 141/59 |
| 5,148,934 A | * | 9/1992 | Kasugai et al. ......... | 220/203.25 |
| 5,279,439 A | * | 1/1994 | Kasugai et al. ......... | 220/203.23 |
| 5,437,317 A | * | 8/1995 | Takatsuka et al. ........... | 141/312 |
| 5,730,194 A | * | 3/1998 | Foltz ............................ | 141/301 |
| 5,740,842 A | * | 4/1998 | Maier et al. .................... | 141/45 |
| 5,791,387 A | * | 8/1998 | Palvolgyi ...................... | 141/348 |
| 5,850,851 A | * | 12/1998 | Miura et al. .................. | 137/583 |
| 5,975,328 A | * | 11/1999 | Hagano et al. ................ | 220/288 |
| 5,992,669 A | * | 11/1999 | Hagano et al. ............... | 220/288 |

(Continued)

FOREIGN PATENT DOCUMENTS

| | | |
|---|---|---|
| JP | S63-130323 U | 8/1988 |
| JP | 2002-161820 A | 6/2002 |

(Continued)

*Primary Examiner* — Mark A Laurenzi
*Assistant Examiner* — Andrew Schmid
(74) *Attorney, Agent, or Firm* — Posz Law Group, PLC

(57) ABSTRACT

A fuel tank opening and closing device is equipped with a tank opening forming member equipped with an injection port forming member having an insertion path and a tank side path arranged outside and inside an injection port, an injection port opening and closing mechanism for opening and closing the injection port, an insertion path forming member, and a drainage mechanism having a drainage path that connects the insertion path and the outside, and exhausts to the outside fuel that has accumulated inside the insertion path, and barrier members arranged on the drainage path. The barrier members are arranged with a labyrinth as the drainage path so that the insertion path cannot be seen from outside.

14 Claims, 8 Drawing Sheets

(56) References Cited

U.S. PATENT DOCUMENTS

| | | | | |
|---|---|---|---|---|
| 5,992,670 A | * | 11/1999 | Hagano et al. | 220/288 |
| 5,992,672 A | * | 11/1999 | Hagano et al. | 220/304 |
| 5,996,829 A | * | 12/1999 | Hagano et al. | 220/203.23 |
| 5,996,830 A | * | 12/1999 | Hagano et al. | 220/203.28 |
| 6,003,709 A | * | 12/1999 | Hagano et al. | 220/88.1 |
| 6,012,599 A | * | 1/2000 | Miura et al. | 220/86.2 |
| 6,033,006 A | * | 3/2000 | Bovellan et al. | 296/97.22 |
| 6,197,858 B1 | * | 3/2001 | Hagano et al. | 524/225 |
| 6,202,882 B1 | * | 3/2001 | Hagano et al. | 220/295 |
| 6,308,852 B1 | * | 10/2001 | Hagano et al. | 220/293 |
| 6,321,801 B1 | * | 11/2001 | Hagano et al. | 141/301 |
| 6,691,750 B1 | * | 2/2004 | Foltz | 141/350 |
| 6,755,057 B2 | * | 6/2004 | Foltz | 70/159 |
| 6,983,773 B1 | * | 1/2006 | Hagano et al. | 141/350 |
| 7,168,467 B2 | * | 1/2007 | Turker et al. | 141/292 |
| 9,102,230 B2 | | 8/2015 | Hagano et al. | |
| 2001/0007324 A1 | * | 7/2001 | Hagano et al. | 220/303 |
| 2001/0054829 A1 | * | 12/2001 | Hagano et al. | 296/97.22 |
| 2002/0017524 A1 | * | 2/2002 | Hagano et al. | 220/304 |
| 2002/0047014 A1 | * | 4/2002 | Hagano et al. | 220/293 |
| 2002/0092581 A1 | * | 7/2002 | Hagano et al. | 141/348 |
| 2002/0125254 A1 | * | 9/2002 | Hagano et al. | 220/562 |
| 2002/0139801 A1 | * | 10/2002 | Hagano et al. | 220/304 |
| 2003/0029869 A1 | * | 2/2003 | Hagano | 220/303 |
| 2003/0075543 A1 | * | 4/2003 | Hagano | 220/255 |
| 2003/0098307 A1 | * | 5/2003 | Hagano et al. | 220/303 |
| 2003/0136785 A1 | * | 7/2003 | Hagano | 220/288 |
| 2003/0173362 A1 | * | 9/2003 | Ishida et al. | 220/375 |
| 2004/0056238 A1 | * | 3/2004 | Hagano et al. | 252/500 |
| 2004/0129706 A1 | * | 7/2004 | Hagano et al. | 220/375 |
| 2004/0239049 A1 | * | 12/2004 | Hagano et al. | 277/628 |
| 2004/0256392 A1 | * | 12/2004 | Hagano et al. | 220/304 |
| 2004/0262312 A1 | * | 12/2004 | Hagano et al. | 220/293 |
| 2005/0040170 A1 | * | 2/2005 | Hagano | 220/304 |
| 2005/0051550 A1 | * | 3/2005 | Hagano | 220/203.23 |
| 2005/0051556 A1 | * | 3/2005 | Hagano | 220/304 |
| 2005/0051557 A1 | * | 3/2005 | Hagano | 220/304 |
| 2005/0051558 A1 | * | 3/2005 | Hagano et al. | 220/304 |
| 2005/0092752 A1 | * | 5/2005 | Hagano et al. | 220/375 |
| 2005/0115971 A1 | * | 6/2005 | Hagano | 220/304 |
| 2006/0027775 A1 | * | 2/2006 | Hagano | 251/144 |
| 2006/0048823 A1 | * | 3/2006 | Hagano | 137/557 |
| 2006/0054623 A1 | * | 3/2006 | Hagano | 220/203.28 |
| 2007/0034287 A1 | * | 2/2007 | Groom et al. | 141/350 |
| 2007/0045322 A1 | * | 3/2007 | Hagano et al. | 220/375 |
| 2007/0114729 A1 | * | 5/2007 | Hagano et al. | 277/628 |
| 2007/0125444 A1 | * | 6/2007 | Hagano et al. | 141/350 |
| 2007/0145056 A1 | * | 6/2007 | Enomoto et al. | 220/304 |
| 2007/0267099 A1 | * | 11/2007 | Stephan et al. | 141/350 |
| 2008/0073352 A1 | * | 3/2008 | Hagano et al. | 220/375 |
| 2009/0020182 A1 | * | 1/2009 | Groom et al. | 141/349 |
| 2009/0084464 A1 | * | 4/2009 | Hagano | 141/312 |
| 2009/0107583 A1 | * | 4/2009 | Benjey | 141/350 |
| 2009/0145516 A1 | * | 6/2009 | Wells et al. | 141/367 |
| 2009/0188582 A1 | * | 7/2009 | Hagano et al. | 141/349 |
| 2009/0189106 A1 | * | 7/2009 | Hagano et al. | 251/147 |
| 2010/0133274 A1 | * | 6/2010 | Hagano | 220/260 |
| 2010/0175785 A1 | * | 7/2010 | Groom et al. | 141/350 |
| 2010/0218849 A1 | * | 9/2010 | Hagano | 141/350 |
| 2010/0295332 A1 | * | 11/2010 | Benjey | 296/97.22 |
| 2011/0079322 A1 | * | 4/2011 | Beier et al. | 141/350 |
| 2011/0240640 A1 | * | 10/2011 | Hagano | 220/86.2 |
| 2012/0000134 A1 | * | 1/2012 | Hagano | 49/386 |
| 2012/0024422 A1 | * | 2/2012 | Cisternino | 141/349 |
| 2012/0192994 A1 | * | 8/2012 | Hagano | 141/379 |
| 2012/0217240 A1 | * | 8/2012 | Dutzi et al. | 220/86.2 |
| 2013/0075395 A1 | * | 3/2013 | Hagano | 220/86.2 |
| 2013/0075399 A1 | * | 3/2013 | Hagano | 220/254.3 |
| 2013/0168392 A1 | * | 7/2013 | Kuyama et al. | 220/86.2 |
| 2013/0193140 A1 | * | 8/2013 | Hagano et al. | 220/86.2 |
| 2013/0206757 A1 | * | 8/2013 | Nagai et al. | 220/86.2 |
| 2013/0213963 A1 | * | 8/2013 | Chretien et al. | 220/86.2 |
| 2013/0228576 A1 | * | 9/2013 | Gerdes | 220/86.2 |
| 2014/0061192 A1 | * | 3/2014 | Aitken et al. | 220/86.2 |
| 2014/0091095 A1 | * | 4/2014 | Hagano et al. | 220/562 |
| 2014/0291996 A1 | * | 10/2014 | Basavarajappa et al. | 292/61 |
| 2015/0001215 A1 | * | 1/2015 | Kito et al. | 220/86.2 |
| 2015/0048087 A1 | * | 2/2015 | Hagano et al. | 220/86.2 |
| 2015/0136768 A1 | * | 5/2015 | Kobayashi et al. | 220/86.2 |
| 2015/0158379 A1 | * | 6/2015 | Stancu et al. | 220/86.2 |
| 2015/0217638 A1 | * | 8/2015 | Chiba et al. | 296/97.22 |

FOREIGN PATENT DOCUMENTS

| | | |
|---|---|---|
| JP | 2008-94271 A | 4/2008 |
| JP | 2012-11848 A | 1/2012 |
| JP | 2012-162164 A | 8/2012 |
| JP | 2012162164 A * | 8/2012 |

* cited by examiner

FUEL TANK OPENING AND CLOSING DEVICE

This application claims the benefit of and priority from Japanese Application No. 2012-215342 filed Sep. 28, 2012, the content of which is incorporated herein by reference.

BACKGROUND OF THE INVENTION

1. Field of the Invention

The present invention relates to a fuel tank opening and closing device for fueling a fuel tank.

2. Description of the Related Art

A fuel tank opening and closing device is disclosed in JP 2012-162164A. The fuel tank opening and closing device is equipped with a tank opening forming member for forming a first opening and a second opening in a fuel path for supplying fuel to a fuel tank, and a first and second valve plate for respectively opening and closing the first and second openings. With the fuel tank opening and closing device, when fueling, by the first valve plate being pressed by the tip of a fueling nozzle, and the second valve plate also being pressed, the first and second valve plates are opened in sequence, and in a state with the fueling nozzle inserted in the first and second openings, fuel discharged from the fueling nozzle is supplied to the fuel tank via the fuel path. Then, when the fuel has reached the full tank fluid level, the fuel fluid level within the fuel path connected to the fuel tank rises, so by detecting the fuel fluid level with a detector provided at the tip of the fueling nozzle, an auto stop function is operated that automatically stops fueling.

In the fuel tank opening and closing device, an exhaust path connecting the fuel path to the outside is provided between the first valve plate and the second valve plate. The exhaust path is a path for exhausting to the outside the fuel that is flowed back upstream of the fuel path through the second opening from the fuel tank side and then accumulated in the fuel path during fueling.

However, the exhaust path also operates as a ventilation path to the fuel path from the outside, so there is the problem that dust, debris and the like entering the fuel path from the outside easily damages the sealing properties of the second valve plate.

SUMMARY

According to an aspect of the invention, the invention is provided with a fuel tank opening and closing device for opening and closing a fuel path for supplying fuel discharged from a fueling nozzle to a fuel tank. The device comprises: an injection port forming member that has (i) an injection port that constitutes a part of the fuel path, and (ii) a tank side path that is in a downstream side of the injection port and constitutes a part of the fuel path; an insertion path forming member that has an insertion path that is in an upstream side of the injection port and constitutes a part of the fuel path, for guiding a fueling nozzle inserted through the insertion path to the injection port; a drainage mechanism that has (i) a drainage path that connects the insertion path to the outside and exhausts fuel accumulated inside the insertion path to the outside, and (ii) a barrier member arranged in the drainage path; and an injection port opening and closing mechanism for opening and closing the injection port. The barrier member is arranged in the drainage path so as to guide the fuel accumulated in the insertion path to the outside, wherein the insertion path is to be invisible from the outside. The ventilation resistance from the outside to the insertion path is greater than the ventilation resistance from the insertion path to the outside.

In the mode, the insertion path and the outside are connected by a drainage mechanism. Fuel accumulated in the insertion path is exhausted to the outside through the drainage path of the drainage mechanism. The drainage path, in addition to fuel flowing to the outside from the insertion path, has a greater ventilation resistance from the outside to the insertion path. Since external debris, dust or the like contacts barrier member before going through the drainage path toward the insertion path, the drainage mechanism prevents the external debris or the like from entering the insertion path. Thus, the injection port opening and closing mechanism or the like does not decreases the sealing properties due to dust or the like entering the insertion path.

(2) In another mode, the barrier member may include walls that forms a labyrinth in the drainage path.

(3) In another mode, the barrier member may include a one-way valve that opens in a direction which is from the insertion path to the outside.

(4) In another mode, the insertion path forming member may include an opening forming member having an insertion opening in an upstream side of the insertion path, and further comprises an insertion side opening and closing mechanism having an opening and closing member for opening and closing the insertion opening.

(5) In another mode, the insertion path forming member may include an opening forming member having an insertion opening in an upstream side of the insertion path, and further comprises an insertion side opening and closing mechanism having an opening and closing member for opening and closing the insertion opening.

(6) Another mode may provide with a fuel tank opening and closing device for opening and closing a fuel path for supplying fuel discharged from a fueling nozzle to a fuel tank. The device comprises: an injection port forming member that has (i) an injection port that constitutes a part of the fuel path, and (ii) a tank side path that is in a downstream side of the injection port and constitutes a part of the fuel path; an insertion path forming member that has an insertion path that is in an upstream side of the injection port and constitutes a part of the fuel path, for guiding a fueling nozzle inserted through the insertion path to the injection port; a drainage mechanism that has (i) a drainage path that connects the insertion path to the outside and exhausts fuel accumulated inside the insertion path to the outside, and (ii) a barrier member arranged in the drainage path; an injection port opening and closing mechanism for opening and closing the injection port; and a base plate for supporting an outside wall of the tank opening forming member on a car body. An opening part facing the outside of the drainage path is arranged near the base plate. The opening part is to be visible from the outside during fueling.

(7) Another mode may has a liquid reservoir for temporarily accumulating fuel that is flowed out from the drainage path to the outside, wherein the liquid reservoir is arranged at a position to be visible from the outside during fueling.

(8) In another mode, the liquid reservoir may be integrally formed on the base plate.

These and other objects, features, aspects, and advantages of the present invention will become more apparent from the following detailed description of the preferred embodiments with the accompanying drawings.

DESCRIPTION OF THE PREFERRED EMBODIMENTS

(1) Schematic Structure of the Fuel Tank Opening and Closing Device

Figure 1:
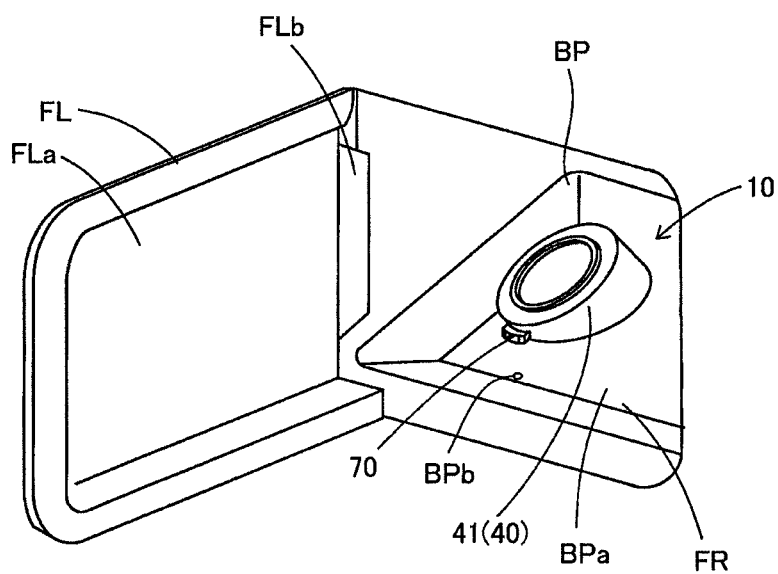
FIG. 1 is a perspective view showing a fuel tank opening and closing device of an embodiment of the present invention.

FIG. 1 is a perspective view showing the fuel tank opening and closing device 10 of an embodiment of the present invention. A fueling lid FL for supplying fuel is supported to be able to open and close on the rear part of the car body of an automobile. With the fueling lid FL, a lid plate FLa that follows the outer plate of the car body is supported to be able to open and close on the outer plate of the car body via a hinge FLb. A base plate BP attached to the car body is arranged in a space opened by the fueling lid FL. The base plate BP forms a fueling chamber FR together with the fueling lid FL. The base plate BP has a liquid reservoir BPa sunk into the inward side of the car body. The fuel tank opening and closing device 10 is supported on the base plate BP. The fuel tank opening and closing device 10 is a mechanism for supplying fuel to a fuel tank without a fuel cap, and after the fueling lid FL is opened. The device 10 is a mechanism that is able to supply fuel from the fueling nozzle to the fuel tank by opening and closing the valve arranged in the fuel path by external force of the fueling nozzle. Following, we will give a detailed description of the constitution of the fuel tank opening and closing device.

(2) Constitution and Operation of Each Part

Figure 2:
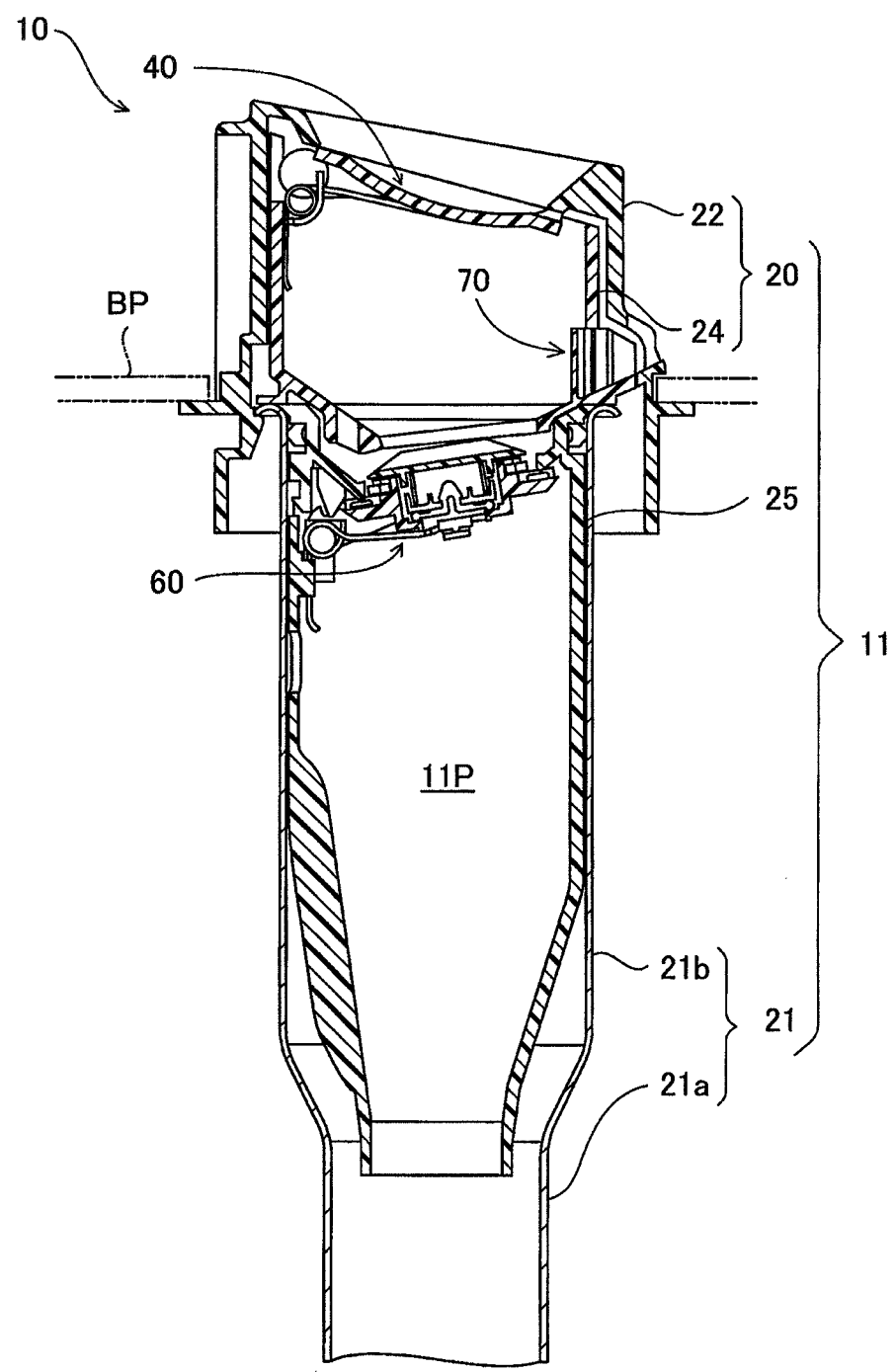
FIG. 2 is a cross section view showing the fuel tank opening and closing device.

FIG. 2 is a cross section view showing the fuel tank opening and closing device 10. In FIG. 2, the fuel tank opening and closing device 10 is equipped with a tank opening forming member 11 having a fuel path 11P connected to the fuel tank (not illustrated), an insertion side opening and closing mechanism 40, an injection port opening and closing mechanism 60 and the drainage mechanism 70.

(2)-1 Tank Opening Forming Member 11

The tank opening forming member 11 forms the fuel path 11P. The tank opening forming member 11 is equipped with a fuel pipe 21, an insertion path forming member 20, and an injection port forming member 25. The fuel pipe 21 is equipped with a reduced diameter part 21a for which the diameter is reduced gradually for the fuel tank side, and a straight pipe part 21b connected to the upper part of the reduced diameter part 21a, and these are integrally formed.

Figure 3:
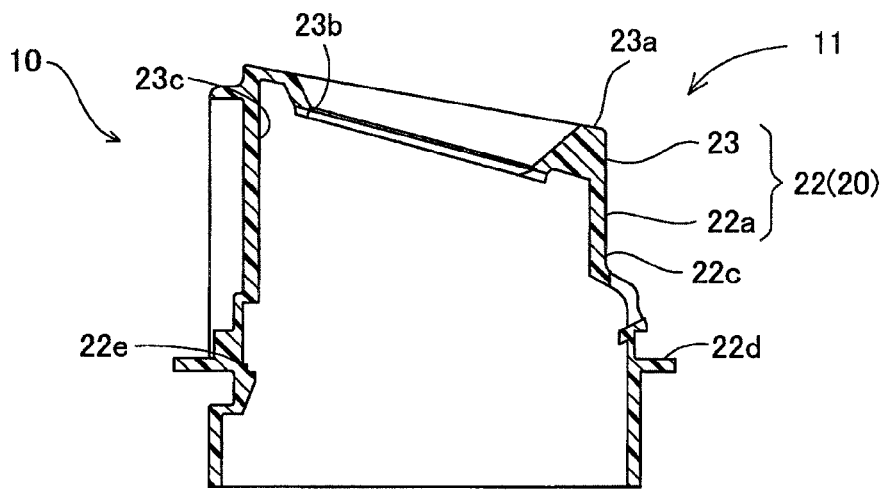
FIG. 3 is an exploded cross section view showing the upper part of the fuel tank opening and closing device.
Figure 3:
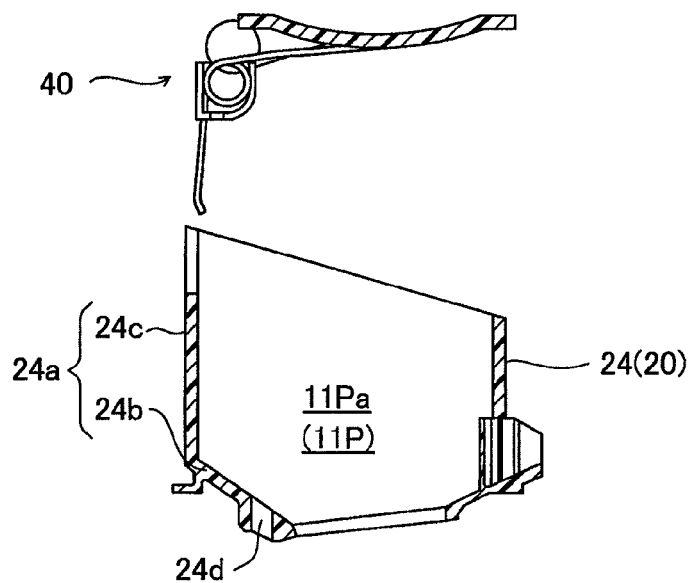
Figure 3:
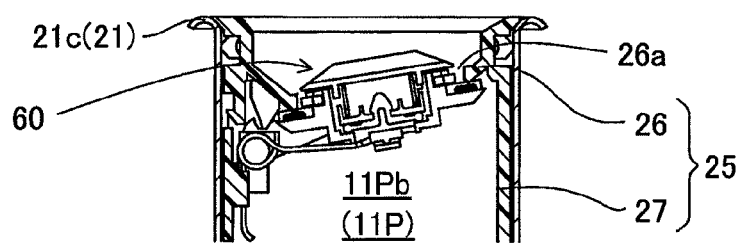

The insertion path forming member 20 is equipped with a cover member 22 with an opening forming member 23, and a path forming member 24. FIG. 3 is an exploded cross section view of the upper part of the fuel tank opening and closing device 10. The cover member 22 is mounted on the upper part of the fuel pipe 21. The cover member 22 is equipped with a round cylinder shaped side wall 22a, and an opening forming member 23. The side wall 22a is equipped with a round cylinder shaped side wall main body 22c, and a flange 22d (FIG. 2) for attaching to the base plate BP. The flange 22d is formed on the outer circumference part of the side wall main body 22c. The upper part of the side wall 22a is tilted so as to be integrally formed on the opening forming member 23. The opening forming member 23 is equipped with an opening part 23a for inserting the fueling nozzle. The opening part 23a is equipped with an insertion opening 23b and an axis support part 23c. The insertion opening 23b is formed in a substantial circle for inserting the fueling nozzle FN and constitutes a part of the fuel path 11P. The path surface area of the insertion opening 23b is narrower than that of the fuel path 11P. The axis support part 23c is formed at the end of the insertion opening 23b, for mounting and supporting the end of the insertion side opening and closing mechanism 40. The cover member 22 is mounted on the fuel pipe 21 by an engagement mechanism which is constituted by an engaging hook 22e of the bottom part of the side wall 22a and a flange 21c of the upper part of the fuel pipe 21.

The path forming member 24 is arranged above the fuel pipe 21 and housed inside the cover member 22, and defines a part of the fuel path 11P in the insertion path 11Pa, for inserting and guiding the fueling nozzle FN. The path forming member 24 is equipped with a path forming main body 24a. The path forming main body 24a is equipped with a tilted wall 24b and a connecting half pipe 24c. The tilted wall 24b is a cone shape to narrow its path surface area as going towards the fuel tank side. On the tilted wall 24b is formed a through hole 24d which connects between the insertion path 11Pa and the fuel path above the opening part 26. The connecting half pipe 24c is formed with cylindrical shape on the upper end of the tilted wall 24b. The upper end of the connecting half pipe 24c is obliquely cut to connect to the inclined shaped opening forming member 23.

The injection port forming member 25 is arranged at the fuel tank side, compared with the position of the opening forming member 23, for supporting the injection port opening and closing mechanism 60. The injection port forming member 25 is equipped with an opening part 26, and a cylinder shaped support member 27 provided projecting from the outer circumference bottom of the opening part 26. The opening part 26 is equipped with an injection port 26a. The injection port 26a is approximately round shaped cross section opening for inserting the fueling nozzle, and constitutes a portion of the fuel path 11P. The path area of the injection port 26a is narrower than that of the fuel path 11P. The support member 27 is housed inside the fuel pipe 21, and is fixed to the fuel pipe 21 via an engagement mechanism such as a hook or the like (not illustrated).

(2)-2 Insertion Side Opening and Closing Mechanism 40

Figure 4:
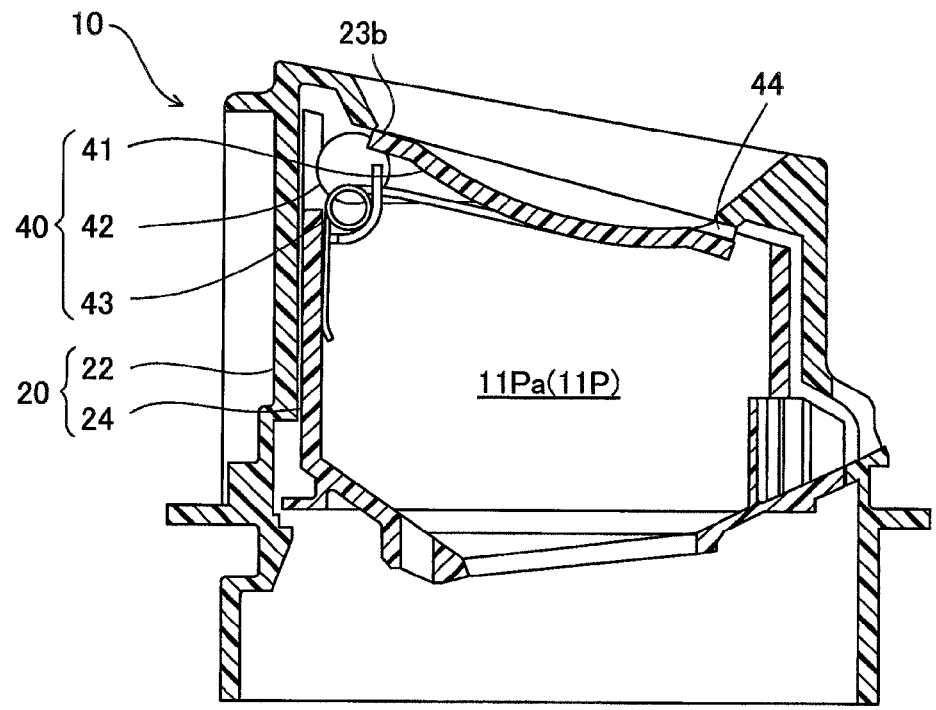
FIG. 4 is a cross section view with part of the fuel tank opening and closing device exploded and the upper part enlarged.
Figure 4:
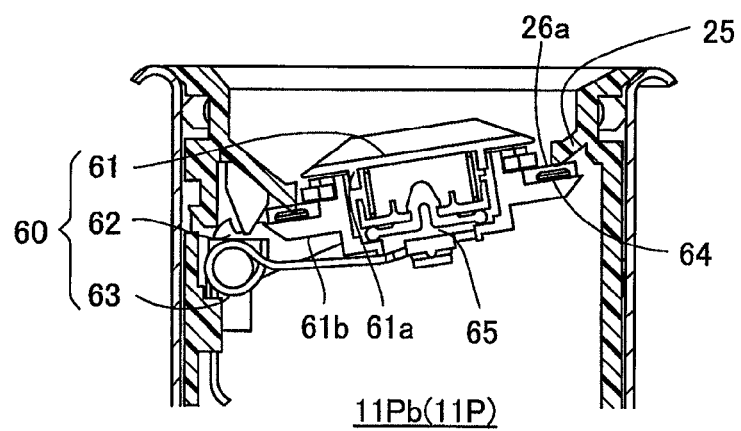

FIG. 4 is an exploded and enlarged cross section view showing the upper part of the fuel tank opening and closing device 10. The insertion side opening and closing mechanism 40 is equipped with an opening and closing member 41, a shaft bearing unit 42, and a spring 43 for biasing the opening and closing member 41 in the closing direction. The opening and closing member 41 opens the insertion opening 23b via rotating with the shaft bearing unit 42 at the center by being pressed by the tip of the fueling nozzle. A seal member 44 is arranged between the top end of the path forming member 24 and the opening circumference end of the insertion opening 23b. The opening and closing member 41 closes the insertion opening 23b with a sealing by pressing the seal member 44.

(2)-3 Injection Port Opening and Closing Mechanism 60

The injection port opening and closing mechanism 60 is equipped with an opening and closing member 61, a shaft bearing unit 62 interposed between the opening and closing member 61 and the injection port forming member 25 and pivotably supporting the opening and closing member 61 to the injection port forming member 25, a spring 63 that biases the opening and closing member 61 in the closing direction, a gasket 64, and a pressure regulating valve 65. The opening and closing member 61 is equipped with a pressing member 61a and a valve chamber forming member 61b, and forms a valve chamber that houses the pressure regulating valve 65. The gasket 64 is formed in a ring shape and made of a rubber material, is mounted on the outer circumference part of the opening and closing member 61. The closing member 61 closes the injection port 26a with a sealing by the gasket 64 being sandwiched by the closing member 61 and the circumference edge part of the injection port 26a. The pressure regulating valve 65 is housed inside the valve chamber, and is equipped with a normal pressure valve biased by the spring. The pressure regulating valve 65 releases the fuel tank pressure by opening when the fuel tank pressure exceeds a preset pressure.

(2)-4 Outside Air Path and Seal Mechanism

Figure 5:
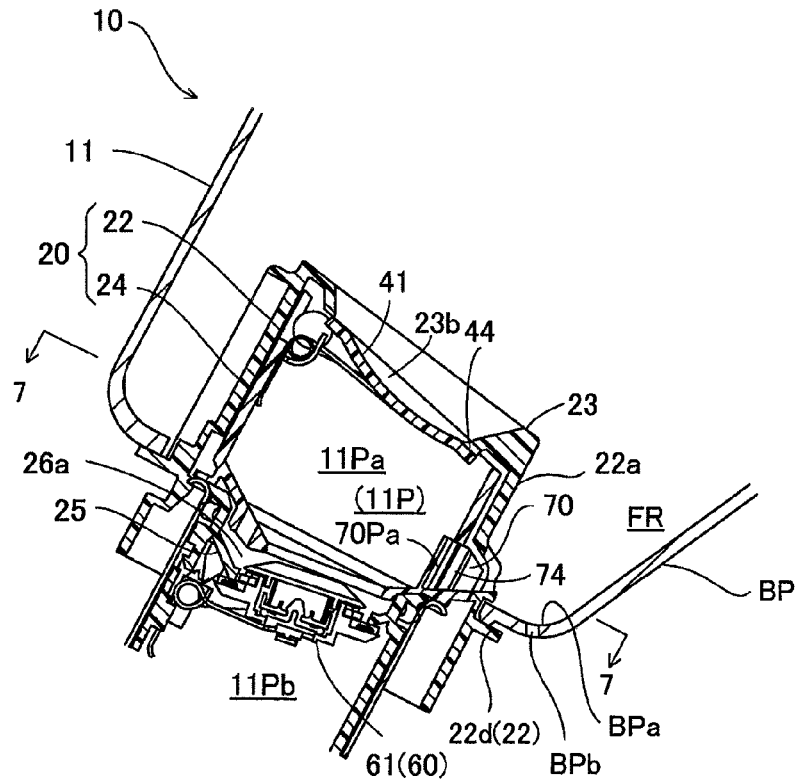
FIG. 5 is a cross section view showing the upper part of the fuel tank opening and closing device.

FIG. 5 is a cross section view showing the upper part of the fuel tank opening and closing device 10. The fuel tank opening and closing device 10 is illustrated in a tilting arrangement in which the closing device 10 is attached to a car body. As described above, the space enclosed by the path forming member 24, the opening and closing member 41, the opening and closing member 61 and the like forms the insertion path 11Pa. The insertion path 11Pa ensures exhausting of fuel to the outside and ventilation with the outside, and has features for preventing water or dust or the like from being entered from the outside. Specifically, the drainage mechanism 70 is constituted by the side wall 22a of the cover member 22 and the path forming member 24.

Figure 6:
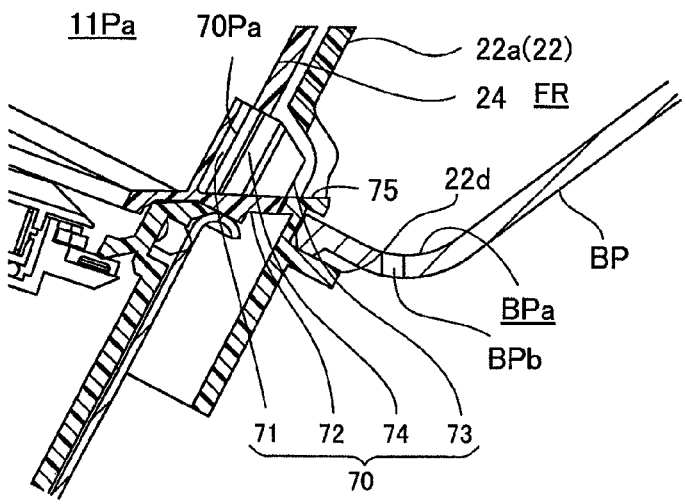
FIG. 6 is a cross section view enlarged around the drainage mechanism of FIG. 5.
Figure 7:
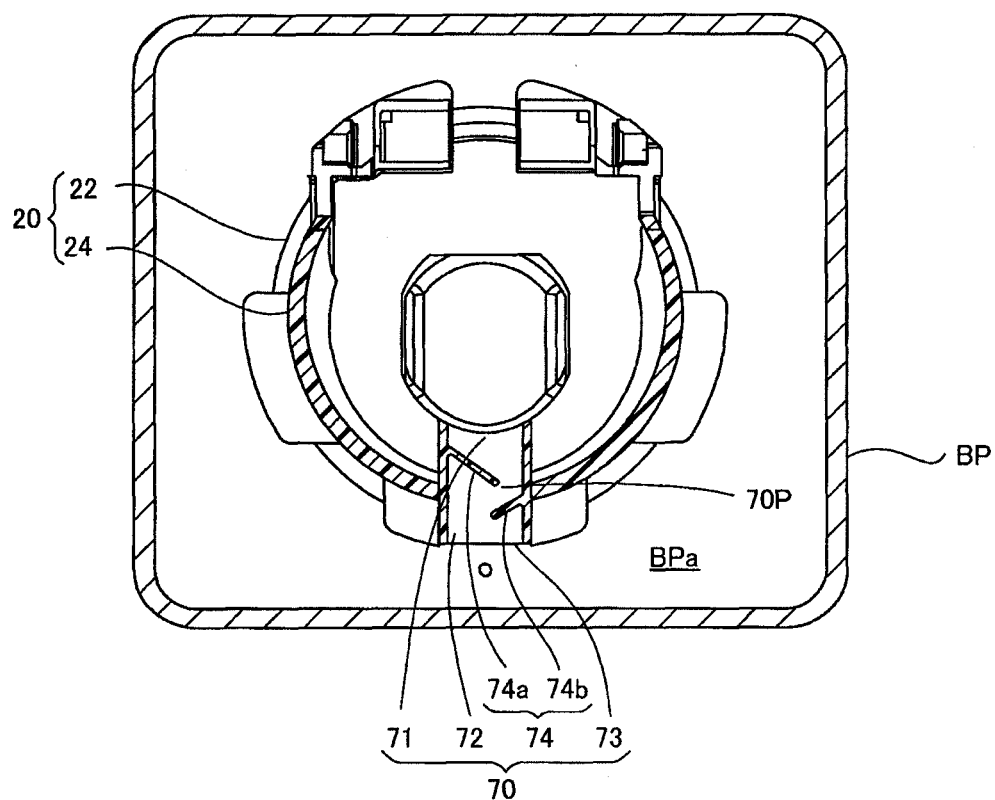
FIG. 7 is a cross section view along line 7-7 in FIG. 5.

FIG. 6 is an enlarged cross section view around the drainage mechanism 70 of FIG. 5, and FIG. 7 is a cross section view along line 7-7 in FIG. 5. The drainage mechanism 70 is equipped with an opening part 71 formed on the path forming member 24, a plane part 72 formed on the bottom of the opening part 71, an opening part 73 formed on the cover member 22, and a plurality of standing walls 74a and 74b erected from the plane part 72 as a barrier member 74. The path between the opening part 71 and the opening part 73 is a drainage path 70Pa. The ends of the standing walls 74a and 74b overlaps at the center part and are provided erected from the plane part 72. The path between the standing walls 74a and 74b forms a labyrinth path 70Pa. The standing walls 74a and 74b block a part of the drainage path 70Pa so that the insertion path 11Pa is invisible from the opening part 73 side. Also, as shown in FIG. 5, the base plate BP having a liquid reservoir BPa is fixed to the flange 22d of the cover member 22. The liquid reservoir BPa is arranged so as to receive fuel discharged through the drainage path 70Pa. Also, an exhaust hole BPb is formed on the liquid reservoir BPa for exhausting the fuel accumulated in the liquid reservoir BPa under the car body. Also, as shown in FIG. 6, a plane projecting part 75 is formed on the outer wall of the cover member 22, integrally formed on the outside end of the plane part 72 of the drainage mechanism 70. The plane projecting part 75 extends radially outward from the side wall 22a, and is arranged above the flange 22d and almost in parallel. The plane projecting part 75 is formed so as to hold the base plate BP with the flange 22d. The plane projecting part 75 may also be integrally formed on the plane part 72 instead of the side wall 22a.

(3) Opening and Closing Operation of the Fuel Tank Opening and Closing Device 10

Next, the operation of fueling is described by the fueling nozzle FZ to the fuel tank opening and closing device 10.

(3)-1 Opening Operation

Figure 8:
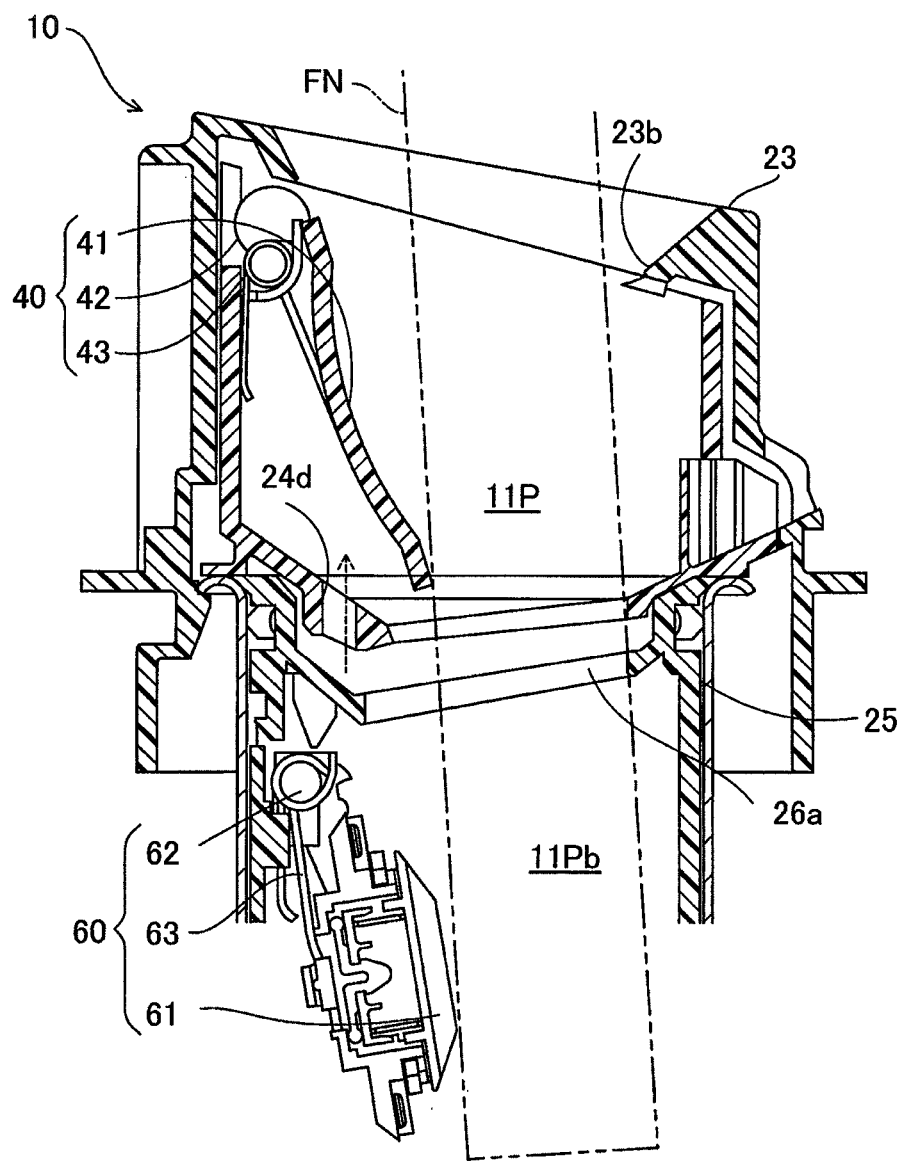
FIG. 8 shows the fueling operation of the fuel tank opening and closing device.

As shown in FIG. 1, when the fueling lid FL is opened, the fuel tank opening and closing device 10, which is arranged inside the fueling chamber FR, appears. As shown in FIG. 8, when the fueling nozzle FN is inserted in the insertion opening 23b of the opening forming member 23, and the tip of the fueling nozzle FN presses the top surface of the opening and closing member 41 of the insertion side opening and closing mechanism 40, the opening and closing member 41 rotates in resistance to the biasing force of the spring 43 of the shaft bearing unit 42 to open the insertion opening 23b. When the fueling nozzle FN is further pushed in, the tip of the fueling nozzle FN contacts the opening and closing member 61, and the opening and closing member 61 rotates with the shaft bearing unit 62. At that time, the fueling nozzle FN is inserted in the tank side path 11Pb. Then, in this state, fuel is supplied from the fueling nozzle FN to the tank side path 11Pb. The fuel level exceeds the full tank fluid level of the fuel tank and rises inside the tank side path 11Pb. The fuel vapors inside the tank side path 11Pb during fueling are released to the outside through a communication hole 24d of the path forming member 24 or the like. Then, when fuel is detected by the sensor near the tip of the fueling nozzle FN, an auto stop function to stop the fuel supply from the fuel gun is triggered and the fueling is stopped.

(3)-2 Closing Operation

When fueling ends, and the fueling nozzle FN is removed from the injection port 26a, the opening and closing member 61 of the injection port opening and closing mechanism 60 rotates by the restoring force of the spring 63 and closes the injection port 26a. When the fueling nozzle FN is removed further to the outside, the opening and closing member 41 of the insertion side opening and closing mechanism 40 rotates by the restoring force of the spring 43 via the shaft bearing unit 42 and closes the insertion opening 23b. Furthermore, the user closes the fueling lid FL (FIG. 1).

(4) Operation and Effect of the Fuel Tank Opening and Closing Device 10

The following operation and effects are exhibited by the fuel tank opening and closing device 10 of the embodiment.

(4)-1 As shown in FIG. 5 and FIG. 6, since the drainage mechanism 70 connects the insertion path 11Pa with the fueling chamber FR, during additional fueling, fuel overflowing from the injection port 26a to the insertion path 11Pa is exhausted through the drainage path 70Pa of the drainage mechanism 70 to the fueling chamber FR, and is accumulated in the liquid reservoir BPa of the base plate BP. When the user visually recognizes the fuel accumulated in the liquid reservoir BPa, the user can stop fueling promptly.

(4)-2 Since the fuel that overflowed to the insertion path 11Pa is temporarily accumulated in the liquid reservoir BPa, and then is exhausted to under the car body through the exhaust hole BPb on the liquid reservoir BPa, the fuel does not flow out from the insertion opening 23b. Thus, during fueling, the user does not get his hands dirty by fuel.

(4)-3 As shown in FIG. 7, since the barrier member 74 is provided erected from the plane part 72 on the drainage path 70Pa of the drainage mechanism 70, and the barrier member 74 forms the labyrinth for the drainage path 70Pa, when external debris, dust or the like comes toward the insertion path 11Pa through the drainage path 70Pa, it contacts the barrier member 74 and falls to the plane part 72, so does not easily enter the insertion path 11Pa. Thus, there is no decrease in sealing properties of the injection port opening and closing mechanism 60 or the like due to dust or the like entering the insertion path 11Pa.

(4)-4 The drainage mechanism 70, in addition to preventing dust and the like from entering the insertion path 11Pa, exhausts fuel to the outside quickly because of a large path area of the drainage path 70Pa. Also, since the path area of the drainage path 70Pa is large, rain or water during the high pressure car washing is not easily accumulated in the drainage path 70Pa though the insertion path 11Pa and then does not freeze, the drainage path 70Pa is not shut.

(4)-5 Since the drainage mechanism 70 is formed at a matching location with the cover member 22 and the path forming member 24, there is no increase in the number of parts to provide the drainage mechanism 70.

(4)-6 As shown in FIG. 6, since the plane projecting part 75 of the drainage mechanism 70 extends radially outward from the side wall 22a of the cover member 22, it is easy to visually recognize the fuel flowing out to the liquid reservoir BPa from the drainage path 70Pa. Also, the plane projecting part 75 and the flange 22d form a recess for assembling the base plate BP, it is easy to do alignment when assembling the base plate BP.

(4)-7 Since the path forming member 24 forms the insertion path 11Pa that connects the insertion opening 23b and the injection port 26a, and guides the fueling nozzle FN from the insertion opening 23b to the injection port 26a, the fueling task is easy.

(4)-8 Since the closing member 41 of the insertion side opening and closing mechanism 40, when not during fueling, closes the insertion opening 23b of the tank opening forming member 11, the closing member 41 prevents dust and the like in the air from reaching the injection port opening and closing mechanism 60 through the insertion path 11Pa, and prevents a decrease in sealing properties of the injection port opening and closing mechanism 60.

The present invention is not limited to the modes, embodiments, and modification examples described above, and it is possible to realize it with various constitutions that do not stray from its gist. For example, it is also possible use the following constitution.

With the embodiment noted above, the standing walls 74a and 74b forms a labyrinth for the drainage path 70Pa for the barrier member 74 of the drainage mechanism 70. But the invention is not limited to this, and it is also possible for the constitution to have low resistance of the exhaust of fuel from the insertion path, eliminating dust or the like contained in the air from outside.

Figure 9:
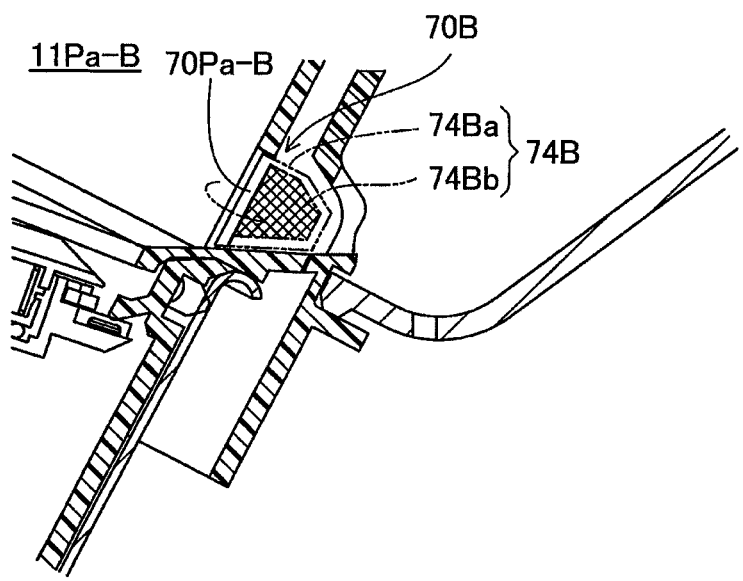
FIG. 9 is a cross section view showing the upper part of the fuel tank opening and closing device of another embodiment of the present invention.

FIG. 9 is a cross section view showing the upper part of the fuel tank opening and closing device of another embodiment of the present invention. In FIG. 9, a drainage mechanism 70B comprises a flap valve 74B that has a valve plate 74Ba with a filter 74Bb as a barrier member. The flap valve 74B constitutes a one-way valve that opens and closes a drainage path 70Pa-B by the valve plate 74Ba. The valve plate 74Ba moves from an insertion path 11Pa-B side to the outside. When the fuel in the drainage path 70Pa-B pushes the valve plate 74Ba, the valve plate 74Ba opens to guide the fuel from the insertion path 11Pa-B to the outside. Also, when the valve plate 74Ba closes the drainage path 70Pa-B, the filter 74Bb prevents dust or the like from entering the insertion path 11Pa-B from the outside.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank opening and closing device for opening and closing a fuel path for supplying fuel discharged from a fueling nozzle to a fuel tank, the device comprising:
a tank opening forming member that forms the fuel path;
an injection port forming member that has (i) an injection port that constitutes a part of the fuel path, the injection port is adapted to be opened by the fueling nozzle, and (ii) a tank side path that is in a downstream side of the injection port and constitutes a part of the fuel path;
an insertion path forming member that has an insertion path that is in an upstream side of the injection port and constitutes a part of the fuel path, wherein the insertion path forming member guides a fueling nozzle inserted through the insertion path to the injection port;
a drainage mechanism that has (i) a drainage path that constantly connects the insertion path at the upstream side of the closed injection port with the atmosphere, the drainage path extends from the insertion path at the upstream side of the closed injection port through the insertion path forming member to the atmosphere, and the drainage path exhausts fuel accumulated inside the insertion path to the atmosphere, and (ii) a barrier member arranged in the drainage path; and
an injection port opening and closing mechanism for opening and closing the injection port,
wherein the barrier member is arranged in the drainage path so as to guide the fuel accumulated in the insertion path to the atmosphere, the barrier member being configured such that the insertion path is inside the fuel tank opening and closing device and the insertion path is not visible from the outside of the fuel tank opening and closing device, and a ventilation resistance from the atmosphere to the insertion path is greater than the ventilation resistance from the insertion path to the atmosphere.

2. The fuel tank opening and closing device according to claim 1 wherein
the barrier member includes walls that forms a labyrinth in the drainage path.

3. The fuel tank opening and closing device according to claim 2 wherein
the insertion path forming member includes an opening forming member having an insertion opening in an upstream side of the insertion path, and
the device further comprises an insertion side opening and closing mechanism having an opening and closing member for opening and closing the insertion opening.

4. The fuel tank opening and closing device according to claim 1 wherein the drainage mechanism includes a one-way valve that opens the drainage path by a valve plate with a filter moving from the insertion path side to the outside.

5. The fuel tank opening and closing device according to claim 4 wherein
the insertion path forming member includes an opening forming member having an insertion opening in an upstream side of the insertion path, and
the device further comprises an insertion side opening and closing mechanism having an opening and closing member for opening and closing the insertion opening.

6. The fuel tank opening and closing device according to claim 1 wherein
the insertion path forming member includes a path forming member that encloses the insertion path and a cover member that covers an outer surface of the path forming member, and
the drainage path is arranged extending across the path forming member and the cover member.

7. The fuel tank opening and closing device according to claim 6 wherein
the insertion path forming member includes an opening forming member having an insertion opening in an upstream side of the insertion path, and
the device further comprises an insertion side opening and closing mechanism having an opening and closing member for opening and closing the insertion opening.

8. The fuel tank opening and closing device according to claim 1 wherein
the insertion path forming member includes an opening forming member having an insertion opening in an upstream side of the insertion path, and
the device further comprises an insertion side opening and closing mechanism having an opening and closing member for opening and closing the insertion opening.

9. A fuel tank opening and closing device for opening and closing a fuel path for supplying fuel discharged from a fueling nozzle to a fuel tank, the device comprising:
a tank opening forming member that forms the fuel path;
an injection port forming member that has (i) an injection port that constitutes a part of the fuel path, the injection port is adapted to be opened by the fueling nozzle, and (ii) a tank side path that is in a downstream side of the injection port and constitutes a part of the fuel path;
an insertion path forming member that has an insertion path that is in an upstream side of the injection port and constitutes a part of the fuel path, wherein the insertion path forming member guides a fueling nozzle inserted through the insertion path to the injection port;
a drainage mechanism that has a drainage path that constantly connects the insertion path at the upstream side of the closed injection port with the atmosphere, the drainage path extends from the insertion path at the upstream side of the closed injection port through the insertion path forming member to the atmosphere, and the drainage path exhausts fuel accumulated inside the insertion path to the atmosphere;
an injection port opening and closing mechanism for opening and closing the injection port; and
a base plate for supporting an outside wall of the tank opening forming member on a car body,
wherein the drainage path has an opening part facing the outside, wherein the opening part is arranged near the base plate, so as to be visible from the outside during fueling.

10. The fuel tank opening and closing device according to claim 9,
further comprising a liquid reservoir for temporarily accumulating fuel that flowed out from the drainage path to the atmosphere, wherein the liquid reservoir is arranged at a position to be visible from the outside during fueling.

11. The fuel tank opening and closing device according to claim 10 wherein
the liquid reservoir is integrally formed on the base plate.

12. The fuel tank opening and closing device according to claim 1 further comprising:
a base plate configured to support an outside wall of the tank opening forming member on a car body, wherein
the insertion path forming member includes a path forming member that encloses the insertion path and a cover member that covers an outer surface of the path forming member, and
the base plate is fixed to the flange of the cover member.

13. The fuel tank opening and closing device according to claim 12 wherein
the cover member is equipped with a round cylinder shaped side wall,
a plane projecting part is formed on the outer wall of the cover member, extends radially outward from the side wall, and is formed so as to hold the base plate with the flange.

14. The fuel tank opening and closing device according to claim 12 wherein
the base plate having a liquid reservoir is arranged so as to receive fuel discharged through the drainage path,
an exhaust hole is formed on the liquid reservoir for exhausting the fuel accumulated in the liquid reservoir under the car body.

* * * * *